United States Patent [19]

Tidwell

[11] 4,368,795

[45] Jan. 18, 1983

[54] ECONOMY SAFETY PASSENGER VEHICLE

[76] Inventor: Hubert Tidwell, Edgewood Villa, Apt. 112, 530 W. 200 South, Price, Utah 84501

[21] Appl. No.: 260,848

[22] Filed: May 5, 1981

Related U.S. Application Data

[63] Continuation-in-part of Ser. No. 87,731, Oct. 24, 1979, Pat. No. 4,283,074.

[51] Int. Cl.³ .................... B62D 9/02; B62D 61/08
[52] U.S. Cl. ............................ 180/212; 180/65 A; 180/213; 180/215; 180/264; 180/333; 280/112 A; 280/772
[58] Field of Search ............... 180/210, 211, 212, 213, 180/215, 216, 264, 265, 65 A, 60, 333; 280/220, 111, 112 R, 112 A, 772

[56] References Cited

U.S. PATENT DOCUMENTS

| | | | |
|---|---|---|---|
| 2,615,727 | 10/1952 | Bancroft | 280/772 |
| 3,294,190 | 12/1966 | Suvor et al. | 180/216 |
| 3,447,623 | 6/1969 | Hott | 180/210 |
| 3,746,118 | 7/1973 | Altorfer | 180/210 |
| 3,777,836 | 12/1973 | Riza | 180/213 |
| 3,893,533 | 7/1975 | Tidwell | 280/112 |
| 4,065,144 | 12/1977 | Winchell | 280/112 A |
| 4,088,199 | 5/1978 | Trautwein | 280/772 |

Primary Examiner—Joseph F. Peters, Jr.
Assistant Examiner—Donn McGiehan
Attorney, Agent, or Firm—B. P. Fishburne, Jr.

[57] ABSTRACT

A safety automobile is reduced in width compared to conventional vehicles and tapers forwardly to nearly a point to minimize head-on collision danger and provide lateral deflection of the vehicle to left or right on striking an obstruction. A dual power system is provided for maximum economy. A rear wheel electric drive is used for short range in-town operation and a front wheel internal combustion engine drive is employed for long range travel. The two drives are independent and can be employed simultaneously in heavy weather or in off-road situations.

7 Claims, 3 Drawing Figures

ECONOMY SAFETY PASSENGER VEHICLE

CROSS-REFERENCE TO RELATED APPLICATION

This application is a continuation-in-part of application Ser. No. 87,731, filed Oct. 24, 1979, now U.S. Pat. No. 4,283,074 for *NARROW TRACK ECONOMY MOTOR VEHICLE*.

BACKGROUND OF THE INVENTION

The object of this invention is to provide a safer and more economical passenger vehicle for both local in-town travel and long distance travel. A dual power system is provided, namely, a rear wheel direct electric drive for short distance travel and an entirely separate front wheel drive for long distance travel including a transverse axis internal combustion engine.

Another major object of the invention is to provide a narrow vehicle having a strong lightweight frame which will minimize collision injuries, particularly those suffered in head-on collisions. The front of the vehicle frame tapers to a near point so that on impact with an obstruction a lateral glancing or deflecting of the vehicle will take place rather than a crushing blow.

A unique steering system for the narrow vehicle is employed whereby lateral tilting of the steering wheel will effect the tilting of the vehicle body, main frame and front steering wheel assembly relative to the rear axle and wheels which remain level. The vehicle body and frame are self-righting under the action of spring suspension means.

Other objects and advantages of the invention will become apparent during the course of the following detailed description.

DETAILED DESCRIPTION

Figure 1:
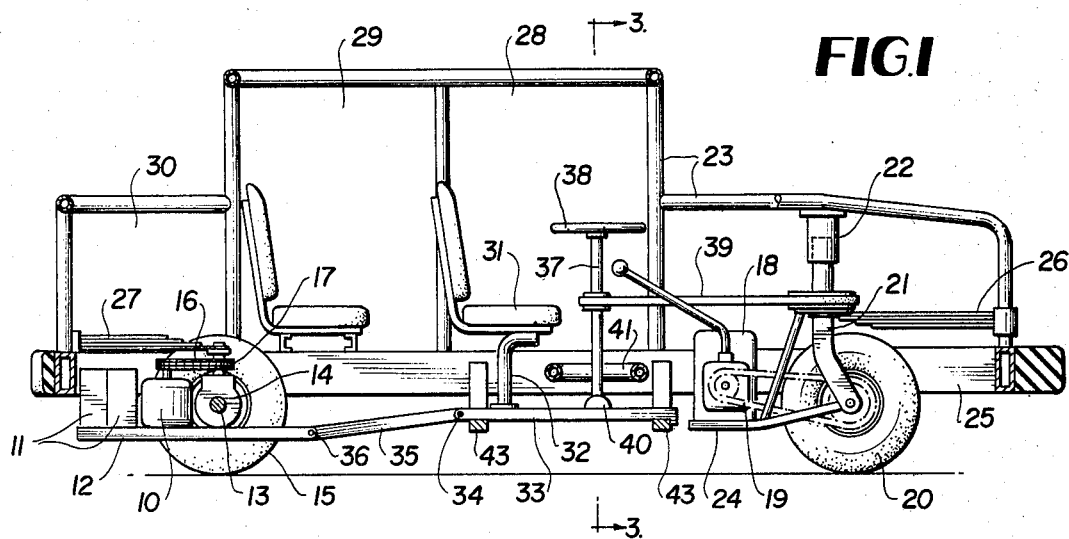
FIG. 1 is a side elevation of a passenger vehicle according to the invention, partly in section and with parts omitted for simplicity of illustration.
Figure 2:
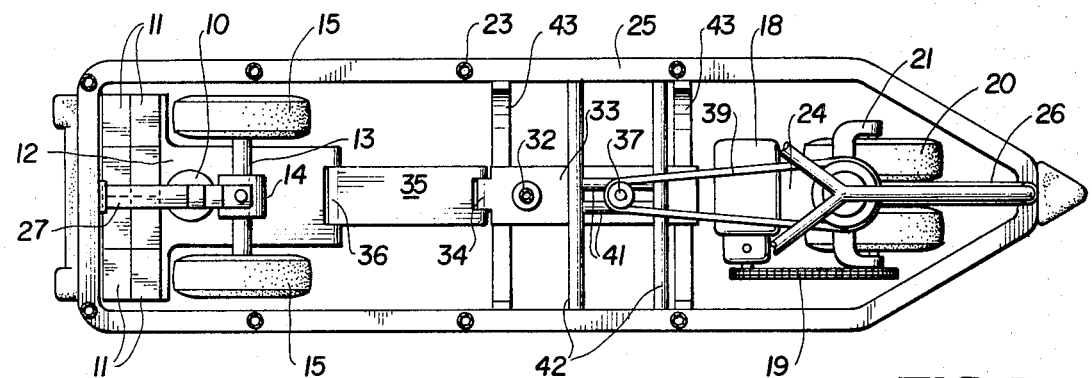
FIG. 2 is a plan view of the vehicle, partly in section.
Figure 3:
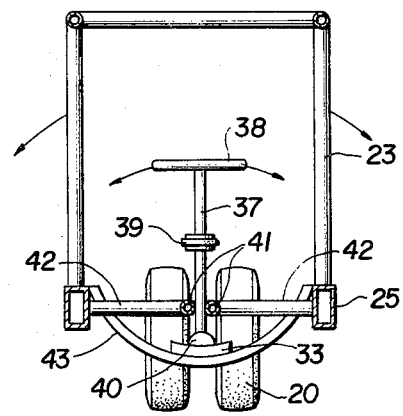
FIG. 3 is a transverse vertical section taken on line 3—3 of FIG. 1.

Referring to the drawings in detail wherein like numerals designate like parts, a rear vehicle drive comprises a vertical axis electric motor 10 powered by storage batteries 11 on a sub-frame or platform 12 carrying a rear axle 13 having a differential 14 and a pair of rear traction wheels 15. Suitable gearing 16 operatively connects the armature shaft of electric motor 10 with a vertical axis input shaft 17 of differential 14.

An independent and separate front wheel drive for the vehicle for powering it in long distance travel includes a transverse axis internal combustion engine 18 connected by gearing 19 to a front traction dual wheel 20 journaled on a steering fork 21 held in a heavy vertical axis bearing 22 at its top rigid with the frame 23 of the vehicle. The engine 18 is supported bodily on a rear horizontal platform extension 24 of the steering fork 21.

The main frame 25 of the vehicle is suspended at its front from the steering fork 21 by a single longitudinal leaf spring 26. The rear of the main frame is similarly suspended by a leaf spring 27 from the axle structure of rear wheels 15.

As shown in FIG. 1, the vehicle provides in tandem relationship a driver's compartment 28, a passenger compartment 29 behind the driver's compartment, and a rear luggage compartment 30. A driver's seat 31 is secured to a pedestal 32 fixed on a horizontal platform section 33 hinged at 34 to an intermediate section 35, hinged at 36 to the rear platform 12.

A vertical steering column 37 having a steering wheel 38 at its top is connected through flexible gearing 39 with the steering fork 21. The lower end of steering column 37 is seated on platform section 33 through a ball and socket support or joint 40. A pair of closely spaced parallel longitudinal reaction bars 41 immediately on opposite sides of the steering column 37 near and above the ball and socket support 40 enable the frame and body of the vehicle including the front steering wheel 20 and engine 18 to tilt laterally when rounding curves for the sake of stability.

This tilting is accomplished as follows. The rear axle 13 and platform sections 12, 35 and 33 with the driver's seat 31 remain level on curves in either direction. The driver seated on the level seat 31 when rounding curves exerts lateral pressure on the steering column 37, tilting it to left or right on its ball mount 40 which is resting on level platform section 33. The great mechanical leverage resulting from the tilting of the steering column 37 acts through the reaction bars 41 and forces the main frame 25, the entire upper frame 23, the steering fork 21, front wheels 20, platform extension 24 and engine 18 to tilt laterally as a unit with the steering column. Torsion action through the rear spring 27 attached to the level non-tilting rear wheel axle enables this action and automatically rights the vehicle after pressure is released from the steering column 37.

The two reaction bars 41 being close to the ball mount 40 exert great tilting leverage on the main frame 25 when the steering column 27 is tilted in either direction. The bars 41 are connected to the main frame 25 by rigid transverse bars 42. The platform section 33 rests on transverse arcuate cradle members 43 tied to the sides of main frame 25 and sufficient relative sliding movement between the elements 33 and 43 can occur when the steering column is tilted to enable the tilting system to function properly.

As explained previously, the rear electric drive may be employed alone for slow speed, short distance travel and the front wheel drive utilizing engine 18 is normally employed for distance travel. While the two drives are separate and independent, they can be employed simultaneously in snow, mud or under off-road conditions for added traction.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A vehicle comprising a rear wheel drive means and a separate and independent front wheel drive means, a frame and body unit including a passenger compartment, front and rear spring means suspending the frame and body unit yieldingly from the rear wheel and front wheel drive means, a driver's seat and a steering column on a level frame portion of the rear wheel drive means, steering gear means interconnecting the steering column with a steering fork of the front wheel drive means, means rockably mounting the steering column on said level frame portion, and rigid reaction means connected with said frame and body unit and straddling said steering column near and above said means rockably mounting the steering column, whereby lateral tilting of the steering column will rock said frame and body unit relative to said rear wheel drive means when the vehicle is rounding a curve.

2. A vehicle as defined in claim 1, and the rear wheel drive means comprising an electrical drive means, said front wheel drive means comprising an internal combustion engine drive means.

3. A vehicle as defined in claim 1, and said front and rear spring means comprising a single front and rear leaf spring at the transverse center of the vehicle interconnecting the frame and body unit and said rear wheel and front wheel drive means.

4. A vehicle as defined in claim 3, and the front wheel drive means comprising a front steering fork having a vertical axis of rotation, a front steering wheel assembly journaled on said fork, said fork having a rearward platform extension, and an engine and transmission means bodily supported on said platform extension.

5. A vehicle as defined in claim 3, and said rear wheel drive means comprising a rear axle and traction wheel assembly including a level platform section, an electric motor and storage batteries on said level platform section, said level frame portion on which the driver's seat and steering column are mounted comprising a forward extension of said level platform section, and an intermediate articulated platform section interconnecting said level frame portion and level platform section.

6. A vehicle as defined in claim 1, and said steering gear means comprising a flexible transmission element and coacting pulley means for such element on the steering column and steering fork.

7. A vehicle as defined in claim 1, and said rigid reaction means comprising a pair of closely spaced parallel longitudinal bars substantially engaging opposite sides of the steering column near the lower end of the steering column.

* * * * *